(12) United States Patent
Malcarne

(10) Patent No.: US 8,413,366 B2
(45) Date of Patent: Apr. 9, 2013

(54) ADJUSTABLE BUTT AND REEL SEAT FOR A FISHING ROD

(75) Inventor: Frederick Joseph Malcarne, Westbrook, CT (US)

(73) Assignee: Winthrop Tool LLC, Deep River, CT (US)

(*) Notice: Subject to any disclaimer, the term of this patent is extended or adjusted under 35 U.S.C. 154(b) by 479 days.

(21) Appl. No.: 12/752,211

(22) Filed: Apr. 1, 2010

(65) Prior Publication Data

US 2010/0251596 A1 Oct. 7, 2010

Related U.S. Application Data

(60) Provisional application No. 61/165,602, filed on Apr. 1, 2009.

(51) Int. Cl.
*A01K 87/00* (2006.01)

(52) U.S. Cl. .............................. 43/18.1 R; 43/23; 43/25

(58) Field of Classification Search .................. 43/18.1, 43/23, 25
See application file for complete search history.

(56) References Cited

U.S. PATENT DOCUMENTS

| | | | |
|---|---|---|---|
| 252,008 A * | 1/1882 | Andrews | 43/18.1 CT |
| 1,893,396 A * | 1/1933 | Bullough | 403/100 |
| 4,077,150 A | 3/1978 | Barnes | |
| 5,557,875 A | 9/1996 | Testa | |
| 5,697,184 A | 12/1997 | Heller | |
| 6,089,652 A | 7/2000 | Miller, Sr. | |
| 6,148,558 A | 11/2000 | Ono et al. | |
| 6,460,285 B2 | 10/2002 | Collins | |
| 7,454,862 B2 * | 11/2008 | Markley et al. | 43/18.1 R |
| 7,533,484 B2 * | 5/2009 | Markley et al. | 43/18.1 HR |
| 2002/0073601 A1 | 6/2002 | DeSorcy | |
| 2005/0072037 A1 * | 4/2005 | Markley et al. | 43/23 |
| 2006/0230669 A1 * | 10/2006 | Markley et al. | 43/23 |

* cited by examiner

*Primary Examiner* — Christopher P Ellis
(74) *Attorney, Agent, or Firm* — Cantor Colburn LLP

(57) ABSTRACT

A fishing rod butt for use with a rod blank and a fishing reel includes a first elongate member hingeably attached to a second elongate member. In this manner, the butt can be configured to have a curvilinear shape or a linear shape depending on the intended fishing application. Also disclosed is an adjustable reel seat assembly.

17 Claims, 6 Drawing Sheets

ADJUSTABLE BUTT AND REEL SEAT FOR A FISHING ROD

CROSS REFERENCE TO RELATED APPLICATIONS

The present application claims the benefit of U.S. Provisional Application No. 61/165,602, which was filed on Apr. 1, 2009 and entitled ADJUSTABLE BUTT FOR A FISHING ROD, incorporated herein by reference in its entirety.

BACKGROUND

The present disclosure generally relates fishing rods and more particularly, to an adjustable butt end and reel seat for a fishing rod.

Most conventional fishing rods used for deep sea sport fishing are made of three primary sections, the rod blank, the handle or butt, and the reel seat. Typically, the rod blank is elongate and defines the distal end of the rod, which is intended to be fitted within the butt. The reel seat is commonly secured directly to the butt rather than to the fishing rod itself. The end of the butt is frequently in the form of a gimbal having intersecting notches, and therefore, the distal end of the butt is specifically configured to be received within a socket permanently but movably mounted on a "fighting chair" on a boat or even on a "fighting belt" secured to a fisherman. In the sport of game fishing, strong forces are often encountered, which forces are transmitted through the rod to the butt assembly. The butt end of the fishing rod is of a static design and typically has a curvilinear or linear shape.

BRIEF SUMMARY

Disclosed herein is an adjustable butt for a fishing rod. The fishing rod butt for use with a fishing reel and a rod blank comprises a first elongate member having an open end configured to receive the rod blank; a second elongate member; and a hinge coupling the first elongate member to the second elongate member, wherein the hinge locks the first and second elongate members in a linear or a curvilinear relationship.

In another embodiment, a fishing rod butt and adjustable reel seat assembly for use with a fishing reel and a rod blank comprises a first elongate member having an open end configured to receive the rod blank comprising an exteriorly threaded zone at about the open end, and a pin protruding from the elongate member in a spaced relationship from the threaded zone, a first annular hood disposed on the first elongate member, the first annular hood comprising a first end configured with a recessed portion for receiving a first reel tongue and a second end configured to receive the pin, wherein engagement of the first annular hood with the pin locks the first annular hood in a set position, a second annular hood spaced apart from the first annular hood and configured with a recessed portion for receiving a second reel tongue, and a nut abutting the second annular hood in threaded engagement with the threaded zone and configured to movably position the second annular hood relative to the first annular hood so as to retain the first and second reel tongues between the first and second annular hoods; a second elongate member; and a hinge coupling the first elongate member to the second elongate member, wherein the hinge locks the first and second elongate members in a linear or a curvilinear relationship.

In yet another embodiment, an adjustable reel seat assembly for a fishing rod butt comprises an open ended elongate member comprises an open ended elongate member comprising an exteriorly threaded zone at about the open end, and a pin protruding from the elongate member in a spaced relationship from the threaded zone, wherein the open end is configured to receive a fishing rod blank; a first annular hood disposed on the elongate member, the first annular hood comprising a first end configured with a recessed portion for receiving a first reel tongue of a fishing reel and a second end configured to receive the pin, wherein engagement of the first annular hood with the pin locks the first annular hood in a set position; and a second annular hood spaced apart from the first annular hood comprising a recessed portion configured for receiving a second reel tongue; and a nut abutting the second annular hood in threaded engagement with the threaded zone and configured to movably position the second annular hood relative to the first annular hood so as to retain the first and second reel tongues between the first and second annular hoods.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein is an adjustable butt and reel seat assembly for a fishing rod. Depending on the intended fishing application, the adjustable butt can be configured to provide a curvilinear shape or a linear shape. The curvilinear shape provided by the adjustable butt can be utilized to provide a mechanical advantage to the end user during fishing. For example, when fighting relatively large and powerful fish, it is sometime advantageous to employ an angled rod. The adjustable butt and real seat assembly is formed of a high strength material, such as steel, although most preferably, a high strength but substantially lightweight material such as aluminum will be used. Other alloys can be employed.

Figure 1:
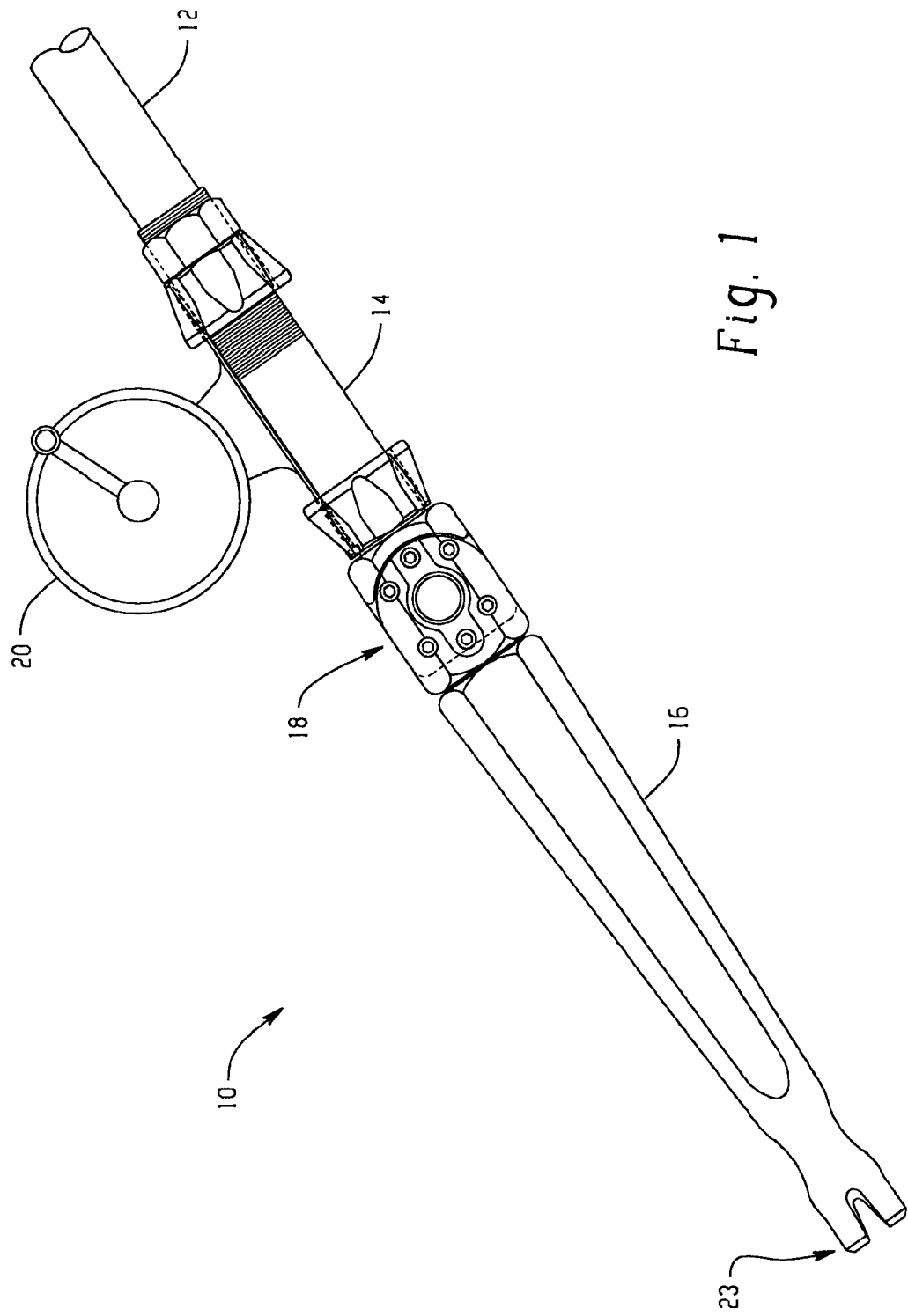
FIG. 1 illustrates an orthogonal view of an adjustable butt for a fishing rod when the butt is set at 0 degrees.
Figure 2:
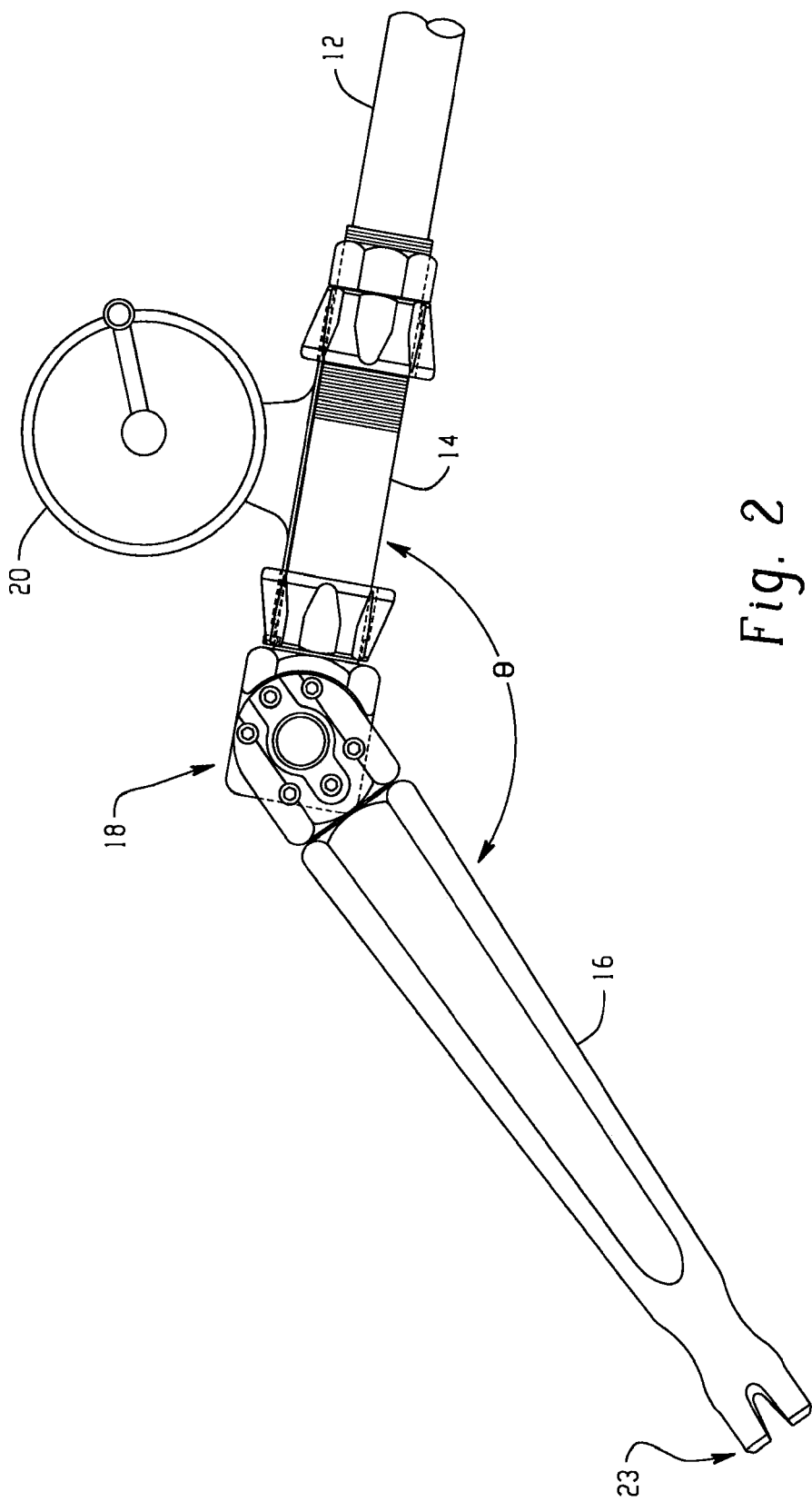
FIG. 2 illustrates an orthogonal view of an adjustable butt for a fishing rod when the butt is set at 45 degrees.

FIGS. 1-2 illustrate orthogonal views of the adjustable butt and reel seat assembly and is generally indicated by reference numeral 10 in accordance with one embodiment for use with fishing reel 20 and a fishing rod blank 12, which is partially shown. FIG. 1 depicts the adjustable butt having a linear shape whereas FIG. 2 depicts a curvilinear shape, wherein θ is about 45 degrees. The adjustable butt and reel seat assembly 10 generally includes a first elongate member 14 hingeably and lockingly coupled to a second elongate member 16 by a hinge, generally shown at 18. The first and second elongate members 14, 16 are generally cylindrical. Although the Figures illustrate butt angles (θ) of about 0 and about 45 degrees, it should be noted that the particular angle (or angles) is not intended to be limited. As will be discussed in greater detail below, the hinge 18 can be configured to provide angles other than 0 and about 45 degrees depending on the desired application and hinge design. Moreover, the hinge 18 can be configured to provide the end user with more than one angle to choose from, i.e., a linear shape and more than one angled shape. The second elongate member 16 may optionally include a gimbal 23 to be received within a socket (also referred to as a gimbal nock, not shown) and may be permanently but movably mounted on a fighting chair on a boat, the boat itself, or even on a fighting belt secured to a fisherman. Optionally, the gimbal 23 may be provided in the form a separate detachable component that is secured to the second elongate member 16 by any suitable means, e.g., press fit, screw fit, and the like.

Figure 3:
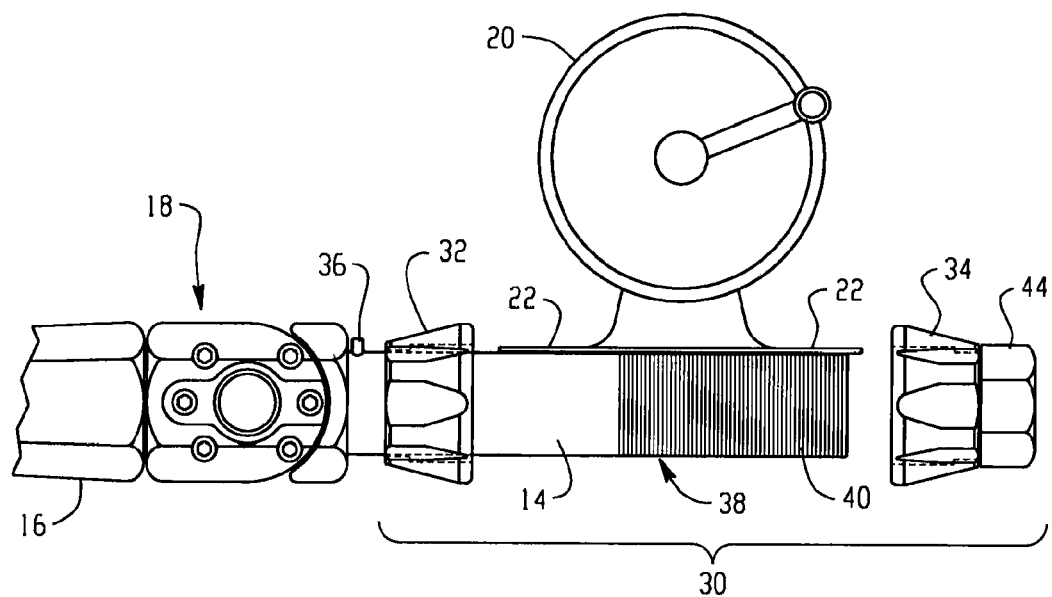
FIG. 3 illustrates a reel seat assembly in accordance with an embodiment of the invention, wherein a reel is shown disengaged from the reel seat assembly.
Figure 4:
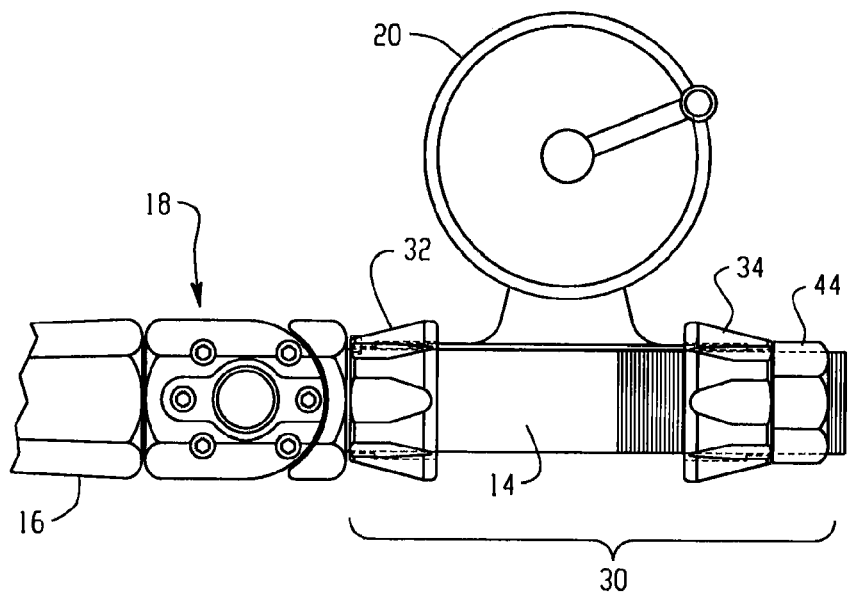
FIG. 4 illustrates a reel seat assembly in accordance with an embodiment of the invention, wherein a reel is shown engaged with the reel seat assembly.

As shown more clearly in FIGS. 3-4, the first elongate member 14 includes a reel seat portion 30 for securely retaining the reel 20. The reel seat portion 30 includes a first annular hood 32 and a second annular hood 34. The first annular hood 32 is rotatably disposed about the first elongate member 14 and abuts hinge 18 when in use. The second annular hood 34 is moveable along the longitudinal axis of the first elongate member 14 so as to permit some adjustment so as to seat variously sized fishing reels. To secure the fishing reel 20 in the reel seat portion 30 at a fixed position, the first elongate member 14 includes a pin 36 at an end proximate to the hinge 18 of the first elongate member 14 and configured to engage a complementary recessed portion 56 in first annular hood 32 (see also FIGS. 5-6). In this manner, the first annular hood 32 is rotatably locked in a fixed position about the first elongate member 14 when engaged with pin 36 as shown in FIG. 4, thereby providing proper placement of the reel 20 on the first elongate member 14 as well as preventing rotation of the reel 20 during use. An exterior threaded zone 38 is formed at the other end 40 of the first elongate member 14 and is configured to movably engage the second annular hood 34 with a second reel tongue of the fishing reel so as to retain the fishing reel within the reel seat portion 30. The interior of the first elongate member 14 at the other end 40 is hollow and is configured to receive the rod blank 12 (shown in FIGS. 1-2). The first and second annular hoods 32 and 34 include recessed portions 42 (shown in silhouette) configured to receive the first and second reel tongues 22 of the reel 20. The second annular hood 34 is optionally coupled to a nut 44, wherein the nut provides for threaded engagement with threads in the threaded zone 38 so as to retain the fishing reel when tightened. In one embodiment, nut 44 is a collet nut and is coupled to the second annular hood 34.

Figure 5:
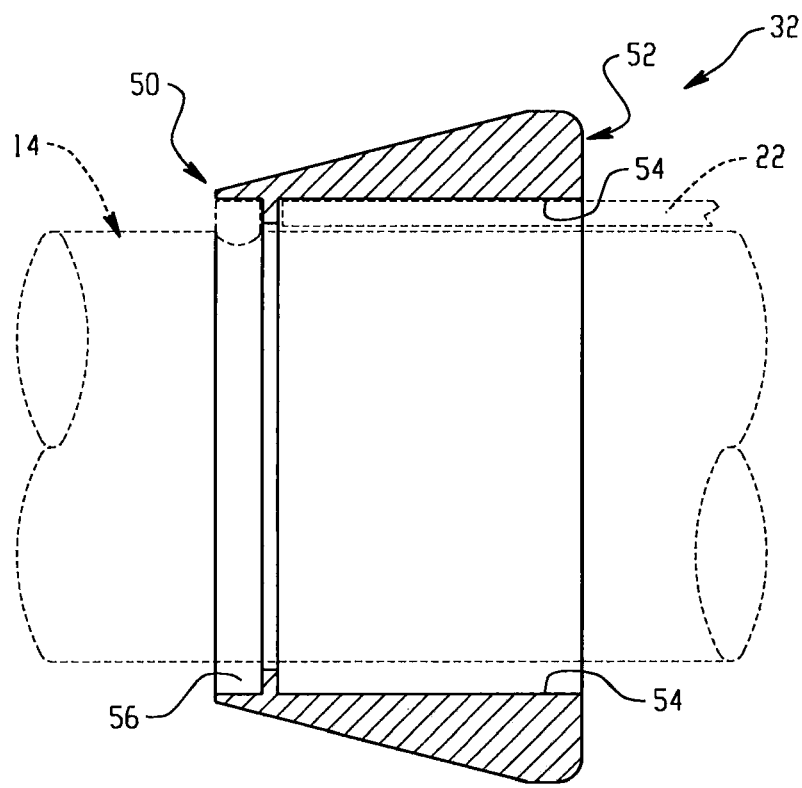
FIG. 5 illustrates a cross sectional view of an annular hood for use with reel seat assembly.
Figure 6:
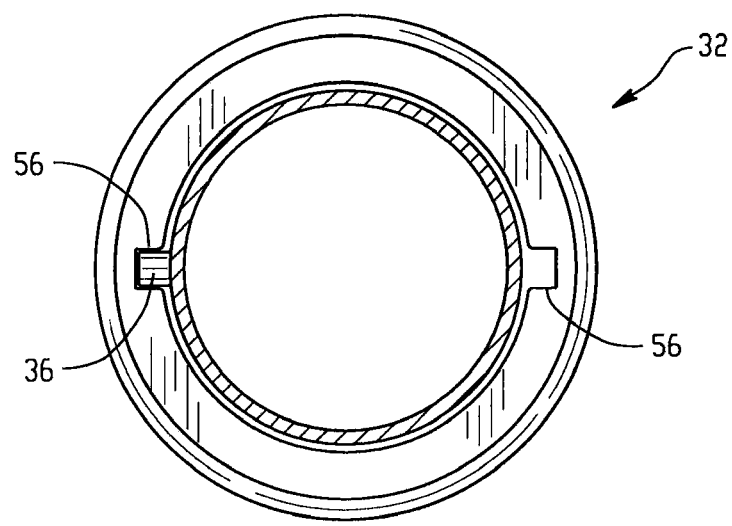
FIG. 6 illustrates an end on view of an annular hood for use with reel seat assembly disposed in an elongate member.

FIGS. 5 and 6 provide sectional and end-on views of the first annular hood 32. As shown, one end 50 of the first annular hood 32 includes a recessed portion 56 configured to receive the pin 36 of the first elongate member 14. Another end 52 includes at least one recessed portion 56 for receiving a reel tongue 22. By engaging the pin 36 in the manner shown, the reel 20 is always seated in the same location on the first elongate member 14 since the presence of the pin prevents rotation of the first annular hood 32. For some embodiments, recessed portion 56 is tapered. The second annular hood 34 includes a similarly shaped recessed portion configured for receiving the second reel tongue 22.

During use, pin 36 is aligned with the recessed portion 56 of the first annular hood 32 to rotatably lock the hood at a fixed position. One of the reel tongues 22 is then inserted into the recessed portion 54 of first annular hood 32 such that the hood 32 is abutting the pin and the hinge, wherein further lateral movement against the hinge and pin is prevented. The second annular hood 34, which is optionally coupled to nut 44, is then movably positioned to engage the other reel tongue 22 with the recessed portion (not shown) of the second annular hood 34, thereby retaining reel 20 within the reel seat assembly 30. The nut serves to bias the second annular hood 34 so as to retain or release a reel disposed within the reel seat assembly 30.

Figure 7:
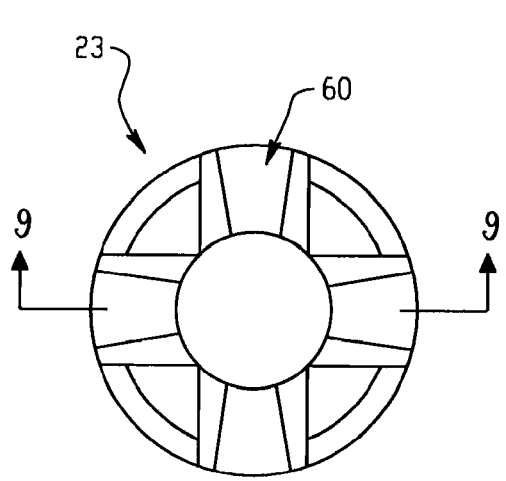
FIGS. 7-9 depict various views of a gimbal disposed at one end of the butt.
Figure 8:
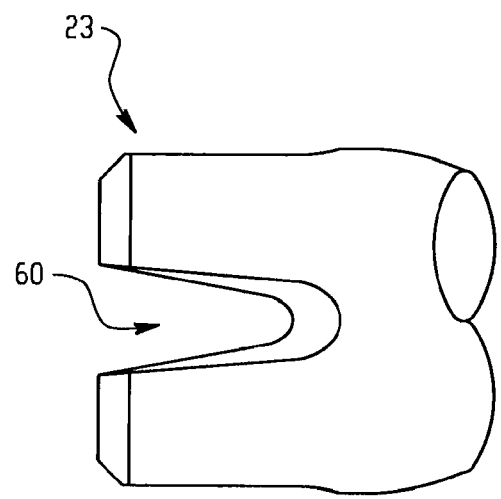
Figure 9:
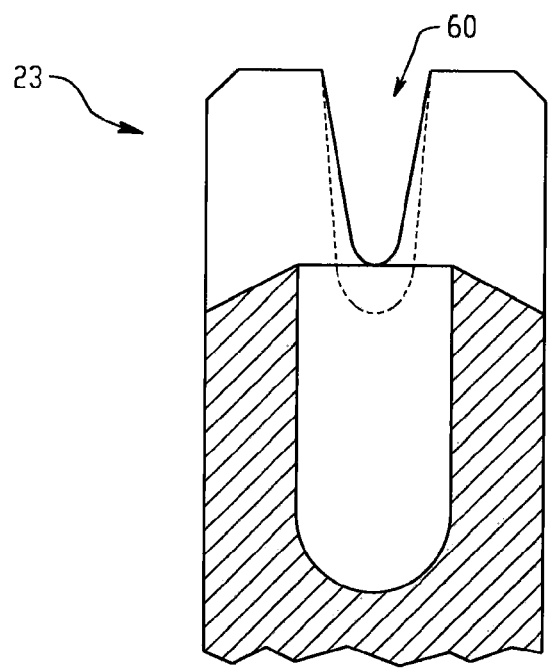
Figure 10:
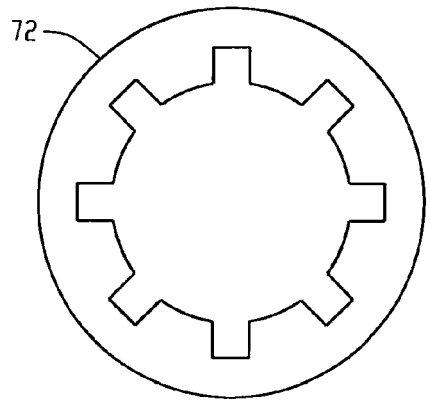
FIGS. 10-15 depict various views of an exemplary spring loaded button hinge for the adjustable fishing butt in accordance with an embodiment of the invention.
Figure 12:
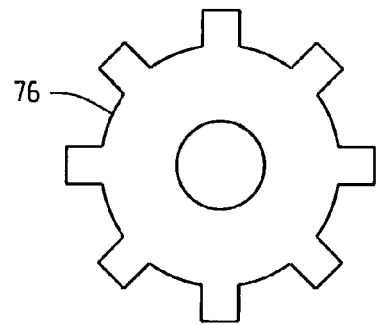
Figure 11:
Figure 13:
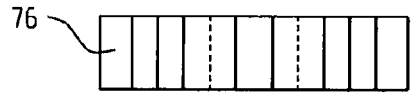

FIGS. 7-9 schematically illustrate various views of the gimbal 23. As noted above, the gimbal 23 includes one or more notches 60 that are configured to locate a pin (not shown) used in a gimbal nock, which may be located in a fighting chair, fighting harness, or boat. Typically, the notches form a cross-hatch as shown. The gimbal nock and gimbal relationship prevents twisting and turning of the fishing rod during a fight or while using the fishing rod for trolling.

FIGS. 10-14 depict various views of an exemplary spring loaded button hinge 18 for changing an angle of the first elongate member 14 relative to the second elongate member 16. The hinge is not intended to be limited to any specific type and is generally lockable in at least two positions, e.g., a linear position, wherein the first and second elongate members 14, 16 are linearly aligned or are configured to provide one or more curvilinear positions, wherein the first elongate member is at a fixed angle relative to the second elongate member 16. The particular angle(s) is not intended to be limited.

Figure 14:
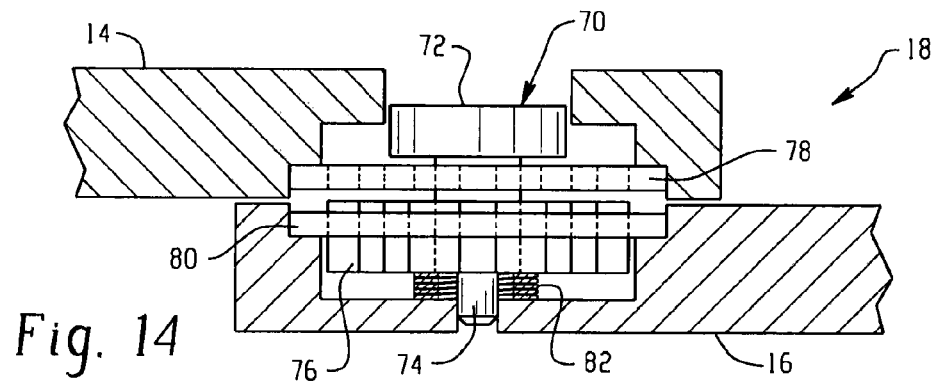
Figure 15:
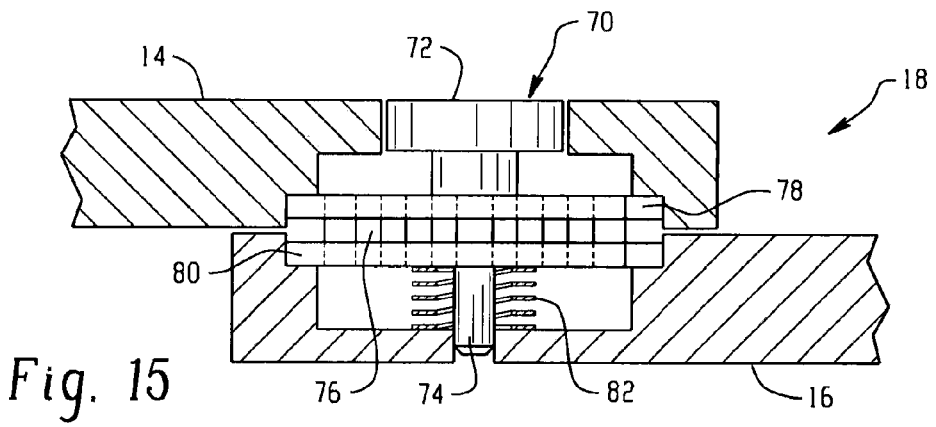

In the exemplary embodiment, the spring loaded button hinge 18 includes a button 70 having a head portion 72 and a pin portion 74 extending from the head portion 72. Coupled to the pin portion 74 is gear 76 having outwardly protruding teeth as clearly shown in FIG. 12. An upper internal gear 78 with inwardly protruding teeth complementary to gear 76 is coupled to the first elongate member 14 and a lower internal gear 80 is coupled to the second elongate member 16. A compression spring 82 is disposed between the lower internal gear 80 and the second elongate member 16. When the spring loaded button 70 is pushed as shown in FIG. 14, gear 76 disengages from the upper internal gear 72 and the first elongate member 14 can be rotated relative to the second elongate member 16. The lower internal gear 80 is configured to provide a stop mechanism to limit rotation of the first elongate member 14 relative to the second elongate member 16. After maximum rotation is achieved, gear 76 meshes with and re-engages upper internal gear 78 to lock the first and second elongate members 14, 16, at a fixed angle but now the first and second elongate members are offset relative to one another and the joint is again rigid and the spring loaded button is in the disengaged position.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A fishing rod butt for use with a fishing reel and a rod blank, comprising:
 a first elongate member having an open end configured to receive the rod blank;
 a second elongate member; and a hinge coupling the first elongate member to the second elongate member, wherein the hinge locks the first and second elongate members in a linear or a curvilinear relationship, wherein the hinge comprises a spring loaded button, an upper internal gear coupled to the first elongate member, a lower internal gear coupled to the second elongate member, and a gear coupled to the spring loaded button selectively engageable with the upper internal gear to lock the first elongate member in the linear or the curvilinear shape relative to the second elongate member.

2. The fishing rod butt of claim 1, wherein the first elongate member further comprises an adjustable reel seat portion comprising a first annular hood abutting the hinge, a second annular hood in spaced relationship to the first annular hood, and a nut abutting the second annular hood in threaded engagement with the first elongate member and configured to movably position the second annular hood relative to the first annular hood so as to retain the fishing reel between the first and second annular hoods, wherein the first and second annular hoods comprise at least one recessed portion configured to receive a fishing reel tongue of the fishing reel.

3. The fishing rod butt of claim 1, wherein the first elongate member further comprises a pin, and wherein the first annular hood comprises a recess configured to receive the pin and prevent rotation of the first annular hood.

4. The fishing rod butt of claim 1, wherein the second elongate member comprises a gimbal at an end of the second elongate member.

5. The fishing rod butt of claim 1, wherein the first and second elongate members are formed of aluminum.

6. The fishing rod butt of claim 1, wherein the curvilinear shape of the first and second elongate members is at about 45 degrees.

7. The fishing rod butt and reel seat assembly of claim 2, wherein the nut is a collet nut and is coupled to the second annular hood.

8. The fishing rod butt of claim 1, wherein the curvilinear shape is defined by at least two different angled positions.

9. A fishing rod butt and adjustable reel seat assembly for use with a fishing reel and a rod blank, comprising:
a first elongate member having an open end configured to receive the rod blank comprising an exteriorly threaded zone at about the open end, and a pin protruding from the elongate member in a spaced relationship from the threaded zone, a first annular hood disposed on the first elongate member, the first annular hood comprising a first end configured with a recessed portion for receiving a first reel tongue and a second end configured to receive the pin, wherein engagement of the first annular hood with the pin locks the first annular hood in a set position, a second annular hood spaced apart from the first annular hood and configured with a recessed portion for receiving a second reel tongue, and a nut abutting the second annular hood in threaded engagement with the threaded zone and configured to movably position the second annular hood relative to the first annular hood so as to retain the first and second reel tongues between the first and second annular hoods;
a second elongate member; and
a hinge coupling the first elongate member to the second elongate member, wherein the hinge locks the first and second elongate members in a linear or a curvilinear relationship.

10. The fishing rod butt and adjustable reel seat assembly of claim 9, wherein the second elongate member comprises a gimbal at an end of the second elongate member.

11. The fishing rod butt and adjustable reel seat assembly of claim 9, wherein the first and second elongate members are formed of aluminum.

12. The fishing rod butt and adjustable reel seat assembly of claim 9, wherein the curvilinear shape of the first and second elongate members is at about 45 degrees.

13. The fishing rod butt and reel seat assembly of claim 9, wherein the hinge comprises a spring loaded button, an upper internal gear coupled to the first elongate member, a lower internal gear coupled to the second elongate member, and a gear coupled to the spring loaded button selectively engageable with the upper internal gear to lock the first elongate member in the linear or the curvilinear shape relative to the second elongate member.

14. The fishing rod butt and reel seat assembly of claim 9, wherein the curvilinear shape has note than one position.

15. The fishing rod butt and reel seat assembly of claim 9, wherein the nut is a collet nut and is coupled to the second annular hood.

16. An adjustable reel seat assembly for a fishing rod butt, comprising:
an open ended elongate member comprising an exteriorly threaded zone at about the open end, and a pin protruding from the elongate member in a spaced relationship from the threaded zone, wherein the open end is configured to receive a fishing rod blank;
a first annular hood disposed on the elongate member, the first annular hood comprising a first end configured with a recessed portion for receiving a first reel tongue of a fishing reel and a second end configured to receive the pin, wherein engagement of the first annular hood with the pin locks the first annular hood in a set position; and
a second annular hood spaced apart from the first annular hood comprising a recessed portion configured for receiving a second reel tongue; and
a nut abutting the second annular hood in threaded engagement with the threaded zone and configured to movably position the second annular hood relative to the first annular hood so as to retain the first and second reel tongues between the first and second annular hoods.

17. The adjustable reel seat assembly of claim 16, wherein the open ended elongate member, the first and second annular hoods, and the nut are formed of aluminum.

* * * * *